United States Patent [19]

Bowman et al.

[11] Patent Number: 4,498,523

[45] Date of Patent: Feb. 12, 1985

[54] CONTINUOUS METHOD FOR RECLAIMING, MELTING AND CASTING ALUMINUM SCRAP

[75] Inventors: Kenneth A. Bowman, Allegheny Township, Allegheny County; Marvin E. Gantz, Jr., Ligonier, both of Pa.

[73] Assignee: Aluminum Company of America, Pittsburgh, Pa.

[21] Appl. No.: 494,071

[22] Filed: May 12, 1983

[51] Int. Cl.³ .............................................. B22D 11/10
[52] U.S. Cl. .................................. 164/477; 29/403.3; 75/63; 75/68 R; 241/23
[58] Field of Search .................. 75/63, 68 R; 241/23; 29/403.3; 225/93.5; 148/2; 164/477

[56] References Cited

U.S. PATENT DOCUMENTS

| | | | |
|---|---|---|---|
| 3,736,896 | 6/1973 | Osborn, Jr. et al. | 113/1 |
| 4,016,003 | 4/1977 | Stauffer | 134/19 |
| 4,119,453 | 10/1978 | Knezevich | 75/0.5 |
| 4,123,294 | 10/1978 | Hanink | 148/13.1 |
| 4,269,632 | 5/1981 | Robertson et al. | 148/2 |
| 4,282,044 | 8/1981 | Robertson et al. | 148/2 |
| 4,330,090 | 5/1982 | Montagna et al. | 241/14 |
| 4,411,707 | 10/1983 | Brennecke et al. | 148/2 |

FOREIGN PATENT DOCUMENTS

1148338  5/1963  Fed. Rep. of Germany ..... 225/93.5

Primary Examiner—M. J. Andrews
Attorney, Agent, or Firm—Andrew Alexander; John P. Taylor

[57] ABSTRACT

A continuous process is disclosed for the recovery of an aluminum alloy from aluminum scrap containing more than one alloy. The recovery is made in a manner which will conserve energy. The process comprises providing a feedstock containing at least two components therein comprised of different aluminum alloys, the components having at least parts thereof joined to each other. The feedstock is treated to cause the joined components to become detached from each other. One of the detached components is separated from the remainder of the feedstock, melted and thereafter continuously cast without substantially upgrading the composition thereof to provide a cast alloy having a composition substantially the same as that from which the separated component was fabricated. The treating may be accomplished by heating the feedstock to a temperature sufficiently high to render fracture sensitive the component having the lowest incipient melting temperature.

24 Claims, 5 Drawing Figures

CONTINUOUS METHOD FOR RECLAIMING, MELTING AND CASTING ALUMINUM SCRAP

BACKGROUND OF THE INVENTION

This invention relates to a continuous process for the recovery, including melting and casting, of used containers fabricated at least in part from different metals or alloys. More particularly, this invention relates to a continuous method or process for reclamation of used containers, such as beverage containers, in a manner which permits recovery or segregation of container components substantially in accordance with their compositions, for example, or composition types. In addition, the invention relates to the recovery of the component in accordance with its composition, melting, casting and fabricating the same into a container, for example, in a continuous manner for conserving energy.

In the packaging or container field, such as the used beverage containers having at least one or more components thereof fabricated from aluminum alloys, there has been ever-increasing interest and extensive research into methods of reclaiming the aluminum components. The interest has been precipitated by the importance of conserving resources and caring for environmental problems. However, heretofore recycling such materials has been greatly hampered by the lack of a method which is economically attractive. For example, attempts to recycle beverage cans having bodies fabricated from one aluminum alloy and tops or lids constructed from a different aluminum alloy often results in an aluminum melt having the composition of neither alloy. Such melt greatly decreases in value and utility because it does not readily lend itself to reuse in the can body or lid without major dilutions, purifications and realloying or other modifications. Thus, it can be seen that there is a great need for a method of recycling containers of the type, for example, described wherein the different components thereof are recovered and segregated according to alloy or according to alloy type.

The problem of segregation of different alloys is recognized in U.S. Pat. No. 3,736,896, where there is disclosed the separating of aluminum alloy tops or lids from steel bodied cans by melting a small band of aluminum around the periphery of the can body to provide a separating area allowing separation of the aluminum end from the steel cylindrical body. In this disclosure, induction heating is used to melt the band wherein an encircling inductor surrounds a bead and is connected to a high frequency power supply. However, this approach seems to presume that a used beverage can is not crushed and the end remains perfectly circular. Further, to melt the ends off in this manner would not seem to be economical since the ends would have to be removed individually.

In U.S. Pat. No. 4,016,003, containers having aluminum alloy bodies and lids are shredded to particles in the range of 1 to 1½ inch and then subjected to temperatures of around 700° F. to remove paints and lacquers. In addition, U.S. Pat. No. 4,269,632 indicates that since the conventional alloys for can ends, e.g., Aluminum Association (AA alloy) 5182, 5082 or 5052, and for can bodies, e.g., AA3004 or AA3003, differ significantly in composition, and in the manufactured can, the end and body are essentially inseparable, and that an economical recycle system requires the use of the entire can. U.S. Pat. No. 4,269,632 further notes that the recycling of cans results in a melt composition which differs significantly from the compositions of both the conventional can end and can body alloys. In this patent, it is suggested that both can end and body be fabricated from the same alloy to obviate the recycling problem. With respect to can ends and bodies made from AA5182 and 3004, it is indicated that normally pure aluminum must be added regardless of the alloy prepared.

In view of these problems with recycling metal containers, such as aluminum beverage containers having components thereof comprised of different alloys, it would be advantageous to have a method which would permit recovery of the containers by segregating the components on a continuous basis according to their alloys or segregating the components according to their alloy type. Additionally, it would be advantageous to continuously melt and cast the segregated component and refabricate it in accordance with normal procedures without, inter alia, expensive dilutions or purification steps.

SUMMARY OF THE INVENTION

An object of this invention is to provide a feedstock comprised of said metallic components, said alloys having different incipient melting temperatures.

An object of the present invention is to provide a continuous process for the recovery of an aluminum alloy from aluminum scrap containing more than one alloy.

Another object of the present invention is to provide a continuous process for the recovery of an aluminum alloy from aluminum scrap in a manner which will conserve energy.

Another object of the present invention is to shred said feedstock and thereafter screen to remove fines therefrom having at least sizes in a size range of the fragment component.

Yet another object of the present invention is to heat the feedstock to effect incipient melting of the component having the lowest incipient melting temperature and agitate sufficiently to cause the component having the lowest incipient melting temperature to fragment.

And yet another object of the present invention is to segregate the fragmented components from the unfragmented feedstock.

A further object of the present invention is to provide for melting one of the components on a continuous basis.

Yet a further object of the present invention is to continuously cast said melted component without substantially upgrading the composition thereof.

In accordance with these objects, a continuous process is disclosed for the recovery of an aluminum alloy from aluminum scrap containing more than one alloy. The recovery is made in a manner which will conserve energy. The process comprises providing a feedstock containing at least two components therein comprised of different aluminum alloys, the components having at least parts thereof joined to each other. The feedstock is treated to cause the joined components to become detached from each other. One of the detached components is separated from the remainder of the feedstock, melted and thereafter continuously cast without substantially upgrading the composition thereof to provide a cast alloy having a composition substantially the same as that from which the separated component was fabricated. The treating may be accomplished by heating the feedstock to a temperature sufficiently high to render fracture sensitive the component having the lowest incipient melting temperature.

The cast component may be worked and refabricated and reused in a container component from which it was recovered.

DETAILED DESCRIPTION OF THE PREFERRED EMBODIMENTS

Figure 1:
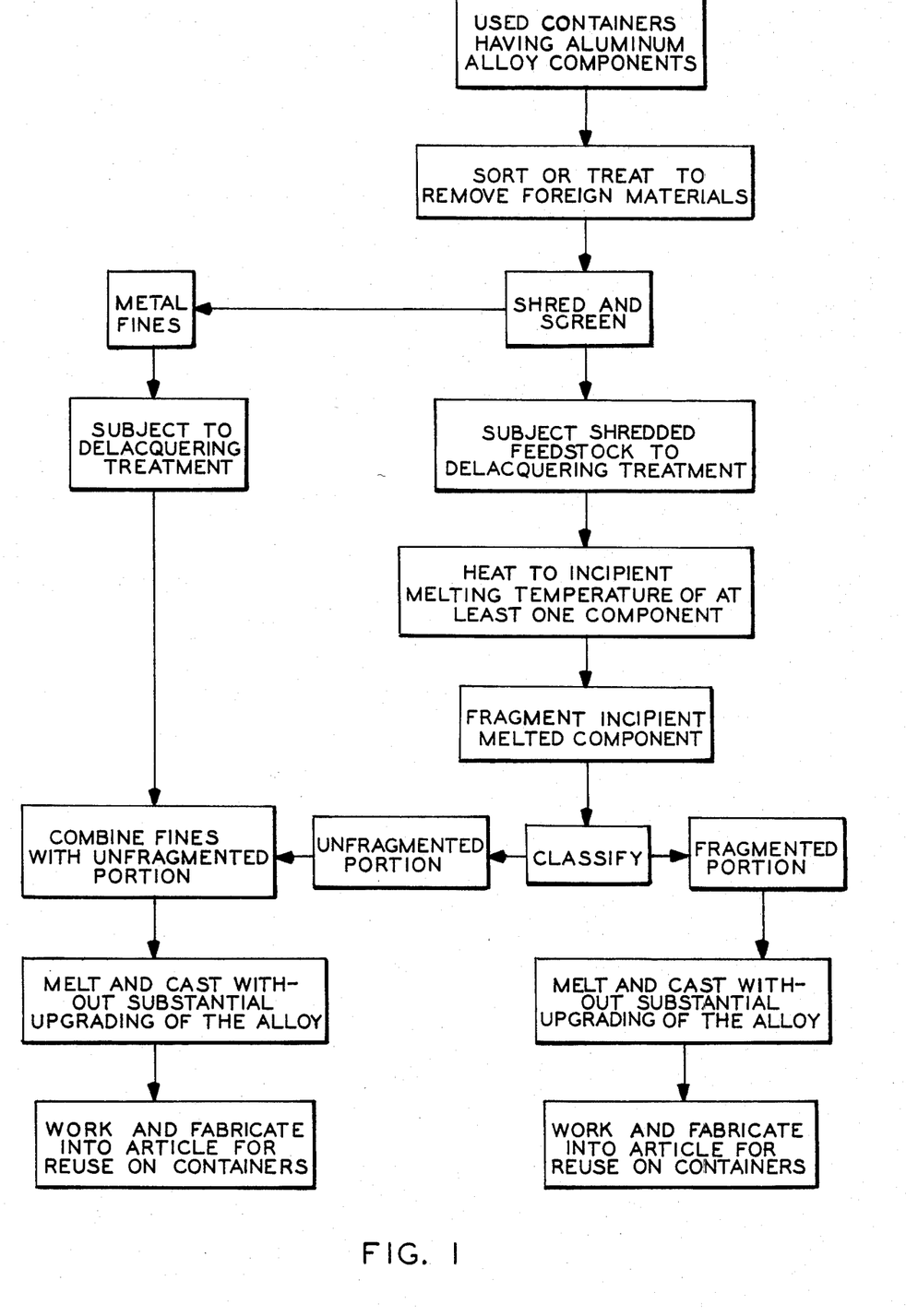
FIG. 1 is a flow sheet illustrating steps which may be used in a process for recycling used aluminum containers wherein certain components thereof can be recovered, melted, cast and refabricated into container components without substantial upgrading of the alloy.

Referring to the flow sheet, used articles from which the aluminum alloy components are to be recovered or reclaimed may comprise containers such as food and beverage containers. Containers to which the process is suited are used beverage containers comprised of two different aluminum alloys. From the flow sheet, it will be noted that the articles to be recovered may be subjected to preliminary sorting to remove materials which would contaminate the aluminum alloy to be recovered. For example, it is desirable to remove glass bottles and steel cans such as used for food, for example. Further, it is desirable to remove other materials such as dirt and sand, etc., in order to cut down on the amount of silicon, for example, that can occur in the reclaimed alloy. Elimination of these materials can permit use of the alloy reclaimed in accordance with the present invention without further purification procedures. The removal of steel preliminarily, as may be present in the form of containers or cans or other sources, aids in keeping the iron in the reclaimed alloy to a level which does not adversely affect the reclaimed alloy properties.

When the materials to be reclaimed are food or beverage containers, there are normally packaged in bales for shipping purposes and, therefore, prior to the sorting step, the bales would normally be broken apart to remove the foreign materials.

The bales may be subjected to a shredding type operation for purposes of breaking them apart. After the shredding operation, the feedstock should be screened to remove metal fines for purposes set forth in detail hereinbelow. As shown in FIG. 1, the fines may be subjected to a delacquering step and then recombined with a compatible fraction of the feedstock in accordance with the invention and eventually melted.

After the shredding and screening step, the shredded feedstock can be subjected to a delacquering step. This may be accomplished by solvent or thermal treatments. The delacquering removes the organic coatings, such as decorative and protective coatings, which can contribute to melting recovery losses if not removed prior to melting. When solvent delacquering is used, it is usually desirable to shred or pierce the containers in order to permit the solvent to drain therefrom. When the coatings are removed by thermal treatments, the temperature used is normally in the range of 600° to 1000° F.

In the next step of the process, particularly where the containers are used beverage containers having bodies formed from Aluminum Association alloy (AA) 3004 and having lids formed from AA5182, for example, the containers are heated to a temperature at which the AA5182 lid becomes fracture sensitive. This temperature has been found to correlate closely with the incipient melting or grain boundary melting temperature of the alloy. Thus, in reference to used beverage containers, this temperature is the incipient melting temperature of AA5182. By the use of incipient melting or grain boundary melting temperature herein is meant the lower temperatures of the melting range or phase melting range and slightly below the temperature at which the alloy develops or significantly increases in fracture sensitivity or at which fragmentation of the alloy can be made to occur without the use of great force. That is, in the fracture sensitive condition, fragmentation can be made to occur by the use of a tumbling action or falling action, and the use of forces such as would be obtained by a hammer mill or jaw crushers are not required. Forces such as encountered with a hammer mill or jaw crusher are detrimental to the instant process since they act to crush the containers, for example, thereby trapping material to be separated. It will be appreciated that many alloys have different incipient melting temperatures. For example, AA3004 has an incipient melting temperature of about 1165° F. and AA5182 has an incipient melting temperature of about 1077° F. and has a phase melting range of about 1077° F. to 1178° F. However, it will be appreciated that this range can vary depending to a large extent on the exact composition of the alloy used. Incipient or grain boundary melting of the alloy greatly reduces its strength and sets up the fracture condition. Thus, the AA55182 lids can be detached or removed from the AA3004 bodies because of the lids being provided in a condition which makes them highly sensitive to fracture and fragmentation. While in this condition, energy, e.g., tumbling action, can be applied for purposes of detaching or removing the lid from the can body. The detaching results primarily from the lid fracturing or fragmenting to provide lid particles which are not only smaller than the can body but generally smaller than a lid.

Thus, after the detaching step, there results a charge or mass comprised of can bodies and fragmented lids, the can bodies being comprised of an alloy or material different from the fragmented lids, the fragmented lids having a particle size distribution substantially different from the can bodies. Thus, it can be seen that not only is it important to remove the lid from the can body, but the lid fragments must have a particle size which is substantially different from the can body. For purposes of obtaining a product or alloy which is not adversely contaminated with the alloy with which it is commingled, the charge is subjected to a treatment for purposes of classifying or segregating the particles. When this aspect of the process is carried out, the result is lid fragments or values comprised of substantially the same alloys which are segregated from the can bodies.

While the process has been described in general terms with respect to reclamation of used beverage cans, it should be understood that the feedstock for the process is not necessarily limited thereto. That is, the process is capable of classifying aluminum alloys, particularly wrought alloys, where one of the alloys can be made fracture sensitive or put in a condition where one of the alloys can be fragmented preferentially in order to obtain a particle size distribution which is different from the particle sizes of the other alloys. In this way, a partition of the alloys can be made. Thus, for example, the feed stock for reclamation may be comprised for used beverage containers having bodies fabricated from AA3004 and lids fabricated from AA5182. Other alloys which may be used for lids include AA5082, 5052 and 5042 (Table X). However, other alloys which may be used for food or beverage can bodies include alloys such as AA3003, AA3104, AA5042 and AA5052 (Table IX). If such alloys are high in magnesium, for example, it is required that such can bodies be fractured or fragmented sufficiently to enable them to be classified with the lid alloys, such as AA5182. Thus, it will be understood that the process of the present invention is not only capable of removing and classifying lids from can bodies, as noted herein, but it is also capable of classifying the alloys in the can bodies with the lids when the alloys are of similar composition and which respond in a similar manner with respect to fracture or fragmentation characteristics, as explained herein.

In addition, where the containers have bodies and lids fabricated from the same alloy, that too may be reclaimed by classifying in accordance with the present invention. For example, if can body and lids are fabricated from sheet having the composition 0.1–1.0 wt.% Si, 0.01–0.9 wt.% Fe, 0.05–0.4 wt.% Cu, 0.4 to 1.0 wt.% Mn, 1.3–2.5 wt.% Mg and 0–0.2 wt.% Ti, the remainder aluminum, this would be classified in accordance with the invention. That is, if the feedstock to be reclaimed comprises used containers fabricated from mixed alloys such as 3004, 5182, 5042, as well as the can body and lid alloy above, this alloy would be expected to be classified with the AA3004 body stock because no incipient melting would occur when the temperature was sufficiently high to cause fracture of AA5182 or AA5042.

Likewise, if steel containers having 5182 lid attached thereto are present in the feedstock, the lids can be classified in accordance with the invention and the steel bodies would be recovered with 3004 can bodies. The steel container bodies can be separated from the aluminum alloys with which they may be classified by magnetic separation means, for example, after the lids have been removed. If the steel bodied containers had lids which fractured at temperatures in the AA3004 incipient melting range, then it would be necessary to heat the containers to a higher temperature as compared to AA5182 to effect a separation of the lid from the steel body after which the steel bodies could be removed by magnetic separation, for example.

From the above, it will be seen that the process of the present invention is rather insensitive to the aluminum feedstock being recovered. That is, the process is capable of handling several types of aluminum alloys and is particularly suited to recovering and classifying wrought alloy products such as is encountered in used containers. If the scrap were comprised of aluminum alloys used in automobiles, for example, AA6009 and AA6010, as described in U.S. Pat. No. 4,082,578 herein incorporated by reference, where the use can be hoods and doors, etc., it may be desirable to subject such articles to a shredding action to provide a generally flowable mass. Or in recovering AA2036 and AA5182 from used automobiles, it may be desirable to shred such products and then effect a separation, as noted herein.

With respect to grain boundary melting or incipient melting of one of the aluminum alloy components to effect fracture sensitivity or fragmentation, it will be understood that this is an important step of the process and must be carried out with a certain amount of care. Using the used beverage cans as an example again, it will be noted that temperature control is important in this step. That is, if the temperature is permitted to get too high, substantial melting of the AA5182 lid can occur, which can result in losses with respect to aluminum and magnesium because of oxidation. Temperatures which bring about substantial melting of the metal normally should be avoided for the additional reason that it can result in coagulation of particles with molten aluminum to form a mass which is not readily flowable when compared to finer discrete particles. Further, molten aluminum can stick to the furnace and start building a layer of metal and particles therein which, of course, interferes with the efficiencies of the whole operation. Also, classification of the congealed mass becomes much more difficult, if not impossible. Lastly, on melting, fines such as sand, glass, dirt and pigments or contaminants such as silicon oxide, titanium oxide and iron oxide tend to become embedded in the molten metal, further making separation thereof difficult. Thus, in view of the above, it can be seen why temperatures which result in substantial melting of one of the aluminum alloy components should be avoided.

Likewise, when temperatures are employed which are too low, the fracture sensitivity of the lids drop dramatically and resistance to fragmentation increases substantially with the result that separation becomes extremely difficult and often segregation cannot be effected. Accordingly, it will be seen that it is important to have the temperature sufficiently high in order to remove the lid from the can body. For lids formed from AA5182, this temperature correlates to about the incipient melting temperature which is about 1077° F. The melting range for AA5182 is about 1077° to 1178° F. Thus, if the used beverage containers are heated to 1100° F., this is well below the melting range of AA3004 (about 1165°–1210° F.) and the lids can be detached or removed without fracturing the can bodies.

With respect to grain boundary or incipient melting, it will be understood that because the sheet from which the lids are fabricated has been rolled to a thin gauge, grains are not well defined. However, it is believed that recrystallization occurs when the used beverage containers are heated, for example, to remove lacquer, which can occur at 850° F., for example. Thus, grain boundary melting can occur.

When the used beverage containers were heated to about or slightly above 1100° F., generally it was found that the AA5182 ends sagged or slumped on the AA3004 can body. However, when the containers were agitated at about this temperature by permitting them to drop from a conveyor belt, for example, the lids were found to detach themselves from the can bodies and were divided or fragmented in small particles while the can bodies were relatively unchanged. Agitation sufficient to detach the ends also may be effected in a rotary furnace or kiln while the used cans are heated to a temperature in the range of 1077° to about 1155° F., with a preferred range being 1077° to 1130° F. and typically not higher than 1120° F. Agitation sufficient to remove the ends in the rotary furnace can be that which occurs at these temperatures when the cans are tumbled inside the furnace. As noted hereinabove, forces such as obtained from hammering or by the use of jaw crushers should not be used because they act to flatten the cans or otherwise entrap the fragmented ends with the can bodies. As noted earlier, operating at temperatures high in the melting range can result in too much liquid metal and the attendant problems therewith. The melting problem becomes particularly acute if the used beverage cans are held for a relatively long time at temperatures high in the melting range. At temperatures in the range of 1077° to 1130° F., the time at temperature can range from 30 seconds to less than 10 minutes.

In the classification step, the AA5182 fragments can be separated by screening from whole can bodies or from can bodies which have been shredded. However, it will be appreciated that other methods of separation may be used, all of which are contemplated to be within the purview of the present invention.

In another aspect of the invention, it has been found important to remove metal fines from the process. That is, when it is found desirable to shred the aluminum articles, e.g., used aluminum materials such as used containers, it has been found that shredding results in the generation of a significant amount of fine metal referred to herein as fines. Normally, the generation of such fines would not be considered to be a significant problem. However, when beverage containers are processed to separate the lids from the container bodies, the lids are fragmented as noted herein, and have a size range substantially smaller than the bodies which permit separation therefrom. However, if the used materials, e.g., used beverage containers, are shredded prior to processing for separation purposes, the shredding can result in fines which are in the size range constituting the lid fragments. The fines generated by shredding, in fact, can be said to contaminate the fragmented portion. For example, if the beverage can is constituted of 75 wt.% AA3004 and 25 wt.% AA5182, the fines generated on shredding a feedstock comprised of such containers can have 93 wt.% of AA3004 and only 7 wt.% AA5182. Thus, it will be seen that there is a great need to prevent this type of contamination in the present process. Omitting the step of removing the fines results then in the fragmented AA5182 portion being contaminated with AA3004 fines from the can bodies. Thus, it has been found that removing fines in the size range corresponding to the size range of the fragmented portion being separated from the container body portion results in substantially fragmented portions being substantially free of fines. The fines should be removed after the shredding step and before the fragmenting step. One method of removing the fines can be the use of screens, although other techniques, such as air separation and the like, are contemplated within the purview of the invention.

When the feedstock used in beverage containers having, for example, AA3004 bodies and AA5182 lids, after shredding, the fines can constitute 1 to 15 wt.% or more of the shredded feedstock.

In a test utilizing whole cans, the used beverage containers were processed in a test apparatus at about 1110° F. The fragmented end pieces were 25.3% of the delacquered can weight. The body parts represented 74.7%. This suggests that the alloy separation was nearly 100% effective. The two portions were melted and analyzed. The spectrographic results appear in Table VIII which may be compared to AA5182 and AA3004 (See Tables IX and X). These analyses further support that 100% separation of the two alloys is possible when the starting material is whole cans.

The following provides an example of the contamination which can result from the fines generated by shredding. From Table X, the composition range for manganese in AA5182 is 0.20 to 0.50 wt.%. Normally, manufacturers of AA5182 maintain the manganese composition near the middle of this range. For purposes of the following examples, it is to be assumed that manganese concentration of 0.38% is desired.

If the process of shredding and subsequent fragmentation is performed on 100 units of used beverage containers, it has been found in one instance that five units of fines generated in the shredding step had a manganese level of 1.10%. These are, therefore, composed almost entirely of AA3004. The fragmentation step produced 20 units of AA5182 with a manganese level of 0.38%. If these 25 units are not separated but are collected together, then the resulting manganese level can be calculated to be 0.52%. This requires significant dilution to produce metal of 0.38% manganese.

In yet another example, if the process produces a shredded product or feedstock that contains approximately 9 wt.% fines, the manganese level of this material is 1.05 wt.%. If these 9 units were collected in the fragmented portion together with the 20 units of AA5182, the total 29 units would have a manganese level of 0.59 wt.%. Again, this requires significant dilution with pure aluminum to produce AA5182 having a manganese level of 0.38 wt.%. Thus, it can be seen that it is important to remove the fines prior to their being commingled with the fragmented portion.

When the containers are beverage containers having AA3004 bodies and AA5182 ends and are classified (see FIG. 1) into fragmented and unfragmented portions in accordance with the invention, the unfragmented portion, e.g. the container bodies, may be melted. When the lids are removed as noted above by heating to incipient melting point, preferably the can bodies are melted immediately upon exiting the kiln or without permitting the temperature of the can bodies to drop significantly. It will be appreciated that by maintaining the can or container bodies at or close to the temperature at which the lids were removed results in a great energy savings in the recycling process. Thus, in accordance with the invention, the can bodies may be remelted in a molten aluminum bath having substantially the same composition as the can bodies. Accordingly, the resulting melt does not require any substantial upgrading before being recast. By substantial upgrading is meant that the composition does not require major dilutions, e.g. 50%, with purer aluminum or the addition of large amounts of alloying constituents, e.g. 50% of the alloy element requirement or more, in order to bring the composition of the melt before casting within the Aluminum Association limits for the particular aluminum alloy used for the unfragmented portion or can bodies. Further, by substantial upgrading in the present invention is meant that the composition resulting from melting of the segregated scrap normally does not require any dilution with respect to the main alloying elements to bring the can bodies, e.g. AA3004, within the Aluminum Association limits, and even in an extreme case, not more than 10 wt.% dilution with higher purity aluminum would be required. Additionally, with respect to substantial upgrading, normally major alloying elements do not have to be added. For example, normally AA3004 can bodies would not require addition of any alloying elements when recovered in accordance with the present invention. However, when recovery of an alloy is being made having an element which may be subject to slight oxidation loss or volatilization at melting temperatures, e.g. magnesium in the 5000 type alloys, adjustments or additions can be made to bring such elements with the desired limits. For example, in the recovery of AA5182 lids from beverage cans, in accordance with the present invention, additions of up to 1.0 wt.% magnesium can be made to adjust the melt composition within Aluminum Association limits and are contemplated within the purview of this invention.

Thus, it will be seen that with respect to the continuous recovery of AA3004 beverage can bodies, the process is capable of separating and melting the can bodies without any upgrading to bring the composition within the Aluminum Association limits. That is, the melt and the sheet product resulting from such melt bodies would have substantially the same composition as the original can bodies, particularly with respect to the major alloying elements of AA3004, e.g. Mn and Mg. However, it will be appreciated that adjustments may be made to the melt in order to have consistency of composition with respect to the cast product. Or, adjustments may be made within these limits, for example, if such is desired by a customer or producer in the end product, e.g. sheet product. Any such adjustment is deemed to be within the purview of the invention.

Used beverage containers were treated in accordance with the present invention to effect alloy separation in a 500,000 pound load comprised mainly of 3004 bodies having 5182 lids or ends thereon. Separation was accomplished to provide essentially "on grade" 3004 and 5182 materials. For example, the 3004 material was analyzed and the main alloying constituents, manganese and magnesium, were found to be 1.02 wt.% manganese and 1.11 wt. % magnesium with the other constituents, silicon, iron and copper, being 0.21 wt.%, 0.41 wt.% and 0.13 wt.%, respectively. A sample out of the 5182 fragments was melted and analyzed and revealed the main alloying constituents, manganese and magnesium, to be 0.34 wt.% and 3.85 wt.%, respectively. Silicon, iron and copper were 0.12 wt.%, 0.25 wt.% and 0.03 wt.%, respectively. Thus, it will be seen that the main alloying constituents in 3004 were well within the Aluminum Association limits for 3004 alloy, and the analysis for the 5182 material was essentially on grade except that the magnesium content required 0.15 wt.% to bring it to the AA lower limit of 4.0. Thus, it will be seen that the process can be operated without any need for dilution or addition with respect to any of the main alloying constituents in the 3004 alloy system. Further, the process can be operated without requirement of dilution with respect to the 5182 alloy system. As already noted in the 5182 system, only 0.15 wt.% magnesium is required to bring the magnesium content up to the Aluminum Association limit or specification which, of course, is much more economical and energy conserving when compared to a system where major dilutions or additions have to be made.

With respect to remelting, it will be appreciated that the can bodies must be ingested into the molten metal melt efficiently in order to minimize the amount of skim that may be generated at aluminum melting temperatures. Melting systems highly suited to this purpose are disclosed in U.S. Pat. Nos. 3,984,234; 4,128,415; and 4,286,985, incorporated herein by reference.

After treating to remove skim or dross, the melt can be provided in ingot form for fabrication into a suitable wrought product with continuous casting being preferred. The cast ingot may be preliminarily worked or shaped to provide suitable stock for subsequent working operations. Prior to the principal working operation, the alloy may be subjected to homogenization. For example, if the alloy is AA3004 type alloys, the homogenization temperature can be in the range of 800° to 1100° F. for a period of 3 to 24 hours, or if the alloy is the AA5182 type, the homogenization can be in the range of 600° to 1000° F. for a period in the range of 2 to 20 hours.

After homogenization, the ingot may be rolled or otherwise worked to produce a sheet type product suitable for fabricating into containers such as beverage containers or lids for such containers, depending on the alloy being recovered. If the product is AA3004 sheet stock for fabricating into containers, the thickness to which the ingot is rolled can be in the range of 0.010 to 0.030 inch, for example.

The melt or molten alloy may be continuously strip cast into a sheet or strip. In this method, there is provided a pair of casting rolls spaced apart to receive the molten metal therebetween. The molten metal is introduced to the rolls through a pour spout fitted into the converging space between the casting rolls on one side thereof. The rolls are turned in a direction to carry molten metal from the spout to the space between the rolls and at the same time extract heat from the molten metal to provide a solid sheet. Such a process is set forth in U.S. Pat. No. 4,054,173, incorporated herein by reference. If the alloy is AA3004, typically it can be cast into a strip 0.25 inch thick with the melt temperature being about 1295° F. Typical casting speed of the strip can be 30 to 40 in./min. It will be appreciated that strip can be further rolled to a final sheet product suitable for forming into containers.

Alternatively, the melt may be continuously cast into a slab approximately one inch thick, for example. This may be accomplished by use of the so-called belt casters such as described in U.S. Pat. No. 4,002,197, incorporated herein by reference. Typical casting speeds for such casters are on the order of 10 to 30 ft./min. The resulting slab may be further hot rolled at temperatures in the range of 600° to 1000° F. to about 0.125 gauge, for example, for purposes of providing a thickness which can be cold rolled to a sheet product.

For purposes of eliminating further fabrication practices, e.g. hot or cold rolling, a melt of the reclaimed alloy may be cast into strips or sheets having a final gauge. That is, the strip or sheet does not require further rolling operations, for example, before being fabricated into containers or lids, if these are the intended products. Thus, for purposes of the present invention, the molten alloy may be cast directly into a thickness in the range of 0.004 to 0.03 with thickness suitable for forming into containers being in the range of 0.10 to 0.030 inch. It will be appreciated that casting the molten metal directly to the required gauge greatly facilitates the economic production of containers, for example, in the recycling process.

An advantage of the present continuous system resides in the fact that opportunity for mistake is virtually eliminated. That is, once separation occurs in accordance with the invention, the possibility of having the separated streams commingled is very remote. In comparison to a batch system where separated components are sometimes stored, there is always the possibility of a component or alloy being charged into the wrong melting furnace. The present invention eliminates this likelihood.

Another advantage of the present invention resides in its relative compactness as compared to conventional processes for producing wrought products such as sheet. That is, the present system lends itself to regulation for highest efficiencies, particularly with respect to conservation of energy. For example, it will be understood that for purposes of melting, container bodies must be heated to or above the melting point of the metal from which they are fabricated. However, direct melting of beverage containers is not normally considered feasible because of contaminants either in or on the can and because it is fabricated from two different alloys, as explained earlier. The present invention requires that the containers only be heated up once which operates to remove lacquer, remove the lid from the can and remove other contaminants in the process. By continuously melting bodies and lids upon their separation and without permitting them to cool, substantial amounts of energy can be saved in the form of heat used for melting.

Another advantage in the compactness of the operation resides in the fact that a computerized system can be used to control every step of the process from the delivery of the can scrap to coiling of the product resulting therefrom. Computerized control permits maximization of efficiency of the continuous process to make it more cost effective.

As further illustrative of the invention, used beverage cans having AA3004 bodies and AA5182 lids thereon were processed through a rotary-type kiln. Samples were taken of ingoing and exiting material for the rotary kiln at four different kiln set temperatures, as follows: 1060°, 1080°, 1100° and 1120° F. Ingoing samples were taken which weighed about 15 kg (35 lb). Approximately six minutes later, representing the residence time of used beverage cans in the kiln, about 45 kg (100 lb) of exiting material was sampled.

Prior to entering the furnaces, bales of used beverage cans were processed through a shredder. The shredder in the process of partially shredding most of the cans, generates some used beverage can fines. In the figures, the screen analyses of ingoing and exiting material are compared at each kiln set temperature to determine the degree to which end fragmentation occurs inside the kiln. This is recognized as a decrease in weight of the coarser fractions and an increase in weight of the finer fractions.

The U.S. Standard Screen sizes that were used to fractionate the samples are listed in Table I, together with the Tyler mesh equivalents.

Samples of each size fraction were melted and analyzed to monitor alloy partitioning and also to measure the amount of tramp impurity pickup.

The chemical composition of a sample makes it possible to calculate the relative amount of AA3004 and AA5182 present. This is done by assuming that AA3004 contains 1.10% manganese and that AA5182 contains 0.38% manganese. A melt of used beverage cans having a manganese content of 0.92% can be shown to contain 75% of AA3004 material and 25% of AA5182 material. This calculation was done for each exiting fraction at the four kiln temperatures of the test. The amount of AA5182 calculated to be present appears as the totally shaded portion on the bar graphs in FIGS. 2-5.

Figure 2:
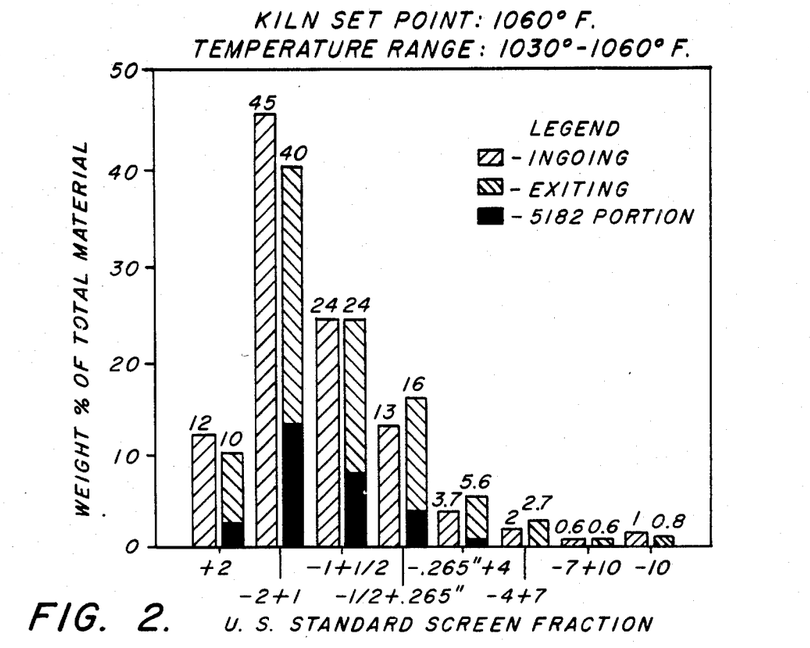
FIG. 2 is a bar graph showing the particle size distribution of material entering and exiting the furnace at a temperature of 1060° F.

FIG. 2 shows the particle size distribution of ingoing and exiting material while the kiln set temperature was 1060° F. The distribution of AA5182 in the exiting material is also shown. The recorded temperature during the sampling period ranged from 1030° and 1060° F. The primary feature in the figure is that very little difference is seen in the size distribution of ingoing and exiting material. It is also shown that the mix of AA5182 and AA3004 in the coarser exiting fractions is approximately 25% and 75%, respectively, which indicates that lid fragmentation did not appear to be occurring at this temperature.

Table II shows the spectrographic analysis of the metal found in each size fraction for both entering and exiting material. Again, ingoing and exiting material for a given size fraction appear to be very similar, except for magnesium.

There does, however, appear to be a variation in composition that is dependent on size fraction which suggests that the crushing step, prior to delacquering, generates more body fines than end fines. The finer fractions exhibit elevated manganese levels and decreased magnesium levels when compared to the coarser fractions. These finer fractions, therefore, appear to be richer in AA3004 content than the coarser ones. With the can body being thinner and accounting for a larger surface area of the can than the end, it may be expected that in shredding used beverage cans the body would produce more fines than would the end. The decreasing magnesium content with finer particle size may also reflect the increased magnesium oxidation incurred when melting the smaller sized material for analysis purposes. The −10 mesh material, both ingoing and exiting, did not contain sufficient metallic material to melt and produce a sample for spectrographic analysis.

Figure 3:
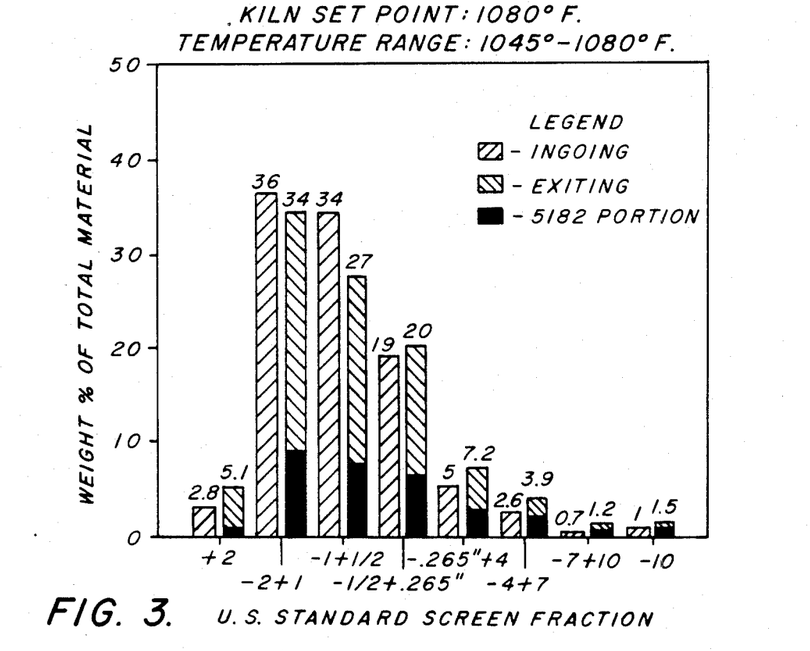
FIG. 3 is a bar graph showing the particle size distribution of material entering and exiting the furnace at a temperature of 1080° F.
Figure 4:
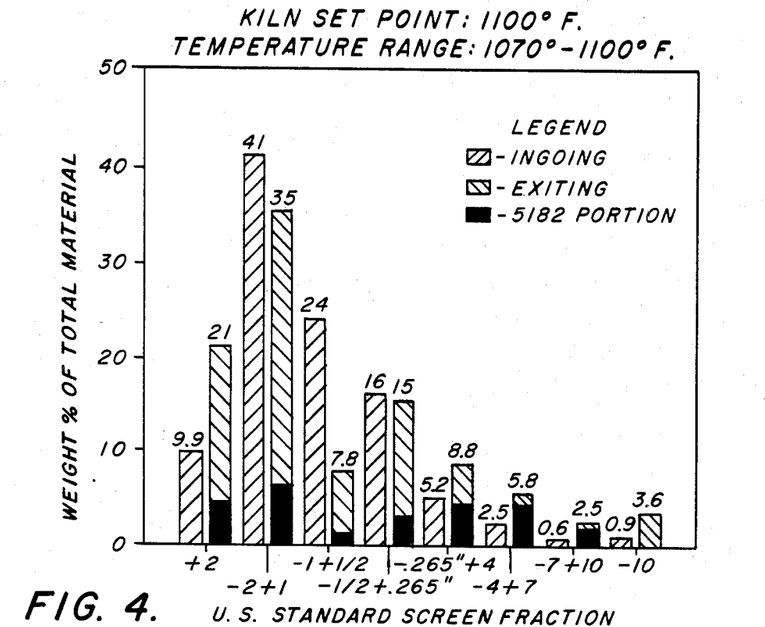
FIG. 4 is a bar graph showing the particle size distribution of material entering and exiting the furnace at a temperature of 1100° F.

The data from samples taken while the kiln set temperatures was 1080° F. and 1100° F. appear in FIGS. 3 and 4 and Tables III and IV, respectively. These samples show fragmentation of AA5182 lids inside the rotary kiln. Specifically, the amount of material present in the finer mesh fractions in the exiting material is increased when compared to the ingoing material; and these fines have compositions that show AA5182 enrichment. This trend is more pronounced at 1100° than at 1080° F.

Figure 5:
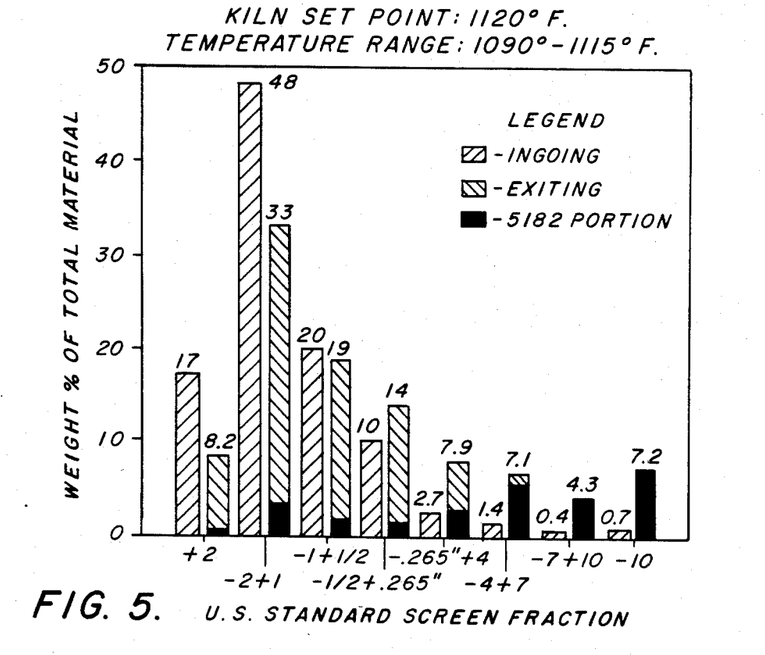
FIG. 5 is a bar graph showing the particle size distribution of material entering and exiting the furnace at a temperature of 1120° F.

The samples taken at 1120° F. show the strongest, definitive evidence for AA5182 fragmentation inside the kiln. The two coarsest fractions have experienced a significant weight reduction after passing through the kiln and the four finer fractions all show a significant weight increase (FIG. 5). The compositions of the fractions (Table V) show that the coarser fractions are nearly commercial grade composition of AA3004 and that the finer material is nearly the commercial grade composition of AA5182. Comparing data for the 1060° F. and 1120° F. experiments shows migration of AA5182 from the coarse fractions to the fine fractions.

Table V shows that metal from the −10 mesh fraction of the 1120° F. sample contains 0.50% silicon. This is very significant since this fraction represents approximately 30% of the AA5182 in the system. This material was further screened down to determine the possibility of screening out the tramp silicon contaminants. The results appear in Table VI. The tramp silicon apparently migrates to the −20 mesh fractions. The −25 mesh fraction contained such a large amount of non-metallic material that it could not be melted to prepare a sample for spectrographic analysis. Visual inspection revealed significant quantities of glass and sand. Chemical analysis of the −25 material appears in Table VII. This fraction contains only about 56% metallic aluminum. The sand and glass content is about 23 wt.%, and the tramp iron content about 1.7 wt.%. Discarding all −20 mesh material, to minimize tramp silicon and iron pickup, will contribute 2.2% to the system loss. However, this material contributes substantially to skim generation and should be removed prior to melting for this reason.

TABLE I

Screens Used to Fractionate the Samples

| U.S. Standard Screen | Tyler Mesh Equivalent |
|---|---|
| 2 inches | 2 inches |
| 1 inch | 1 inch |
| 0.5 inch | 0.5 inch |
| 0.265 inch | 3 mesh |
| No. 4 | 4 mesh |
| No. 7 | 7 mesh |
| No. 10 | 9 mesh |
| No. 14 | 12 mesh |
| No. 18 | 16 mesh |
| No. 20 | 20 mesh |
| No. 25 | 24 mesh |

TABLE II

Chemical Analyses of Ingoing (IN) and Exiting (OUT) Material For Each Size Fraction. Kiln Set Temperature: 1060° F.

| U.S. Screen | Si | Fe | Cu | Mn | Mg |
|---|---|---|---|---|---|
| +2" | | | | | |
| IN | .17 | .41 | .11 | .90 | 1.19 |
| OUT | .17 | .41 | .11 | .91 | 1.23 |
| −2" + 1" | | | | | |
| IN | .17 | .41 | .11 | .92 | 1.22 |
| OUT | .18 | .40 | .10 | .86 | 1.20 |
| −1" + ½ | | | | | |
| IN | .16 | .38 | .10 | .85 | 1.72 |
| OUT | .16 | .39 | .11 | .86 | 1.02 |
| −½" + 0.265" | | | | | |
| IN | .17 | .41 | .11 | .91 | 1.19 |
| OUT | .17 | .40 | .11 | .92 | .78 |
| −0.265" + 4 | | | | | |
| IN | .21 | .41 | .12 | 1.00 | .73 |
| OUT | .24 | .42 | .12 | 1.01 | .78 |
| −4 + 7 | | | | | |
| IN | .37 | .45 | .14 | 1.06 | .35 |
| OUT | .26 | .45 | .13 | 1.05 | .68 |
| −7 + 10 | | | | | |
| IN | .24 | .44 | .13 | 1.06 | .26 |
| OUT | .24 | .48 | .13 | 1.03 | .54 |
| −10* | | | | | |
| IN | — | — | — | — | — |
| OUT | — | — | — | — | — |

*Contained insufficient metal content for quantometer analysis.

TABLE III

Chemical Analyses of Size Fractions Exiting the Kiln at a Set Temperature: 1080° F.

| U.S. Screen | Si | Fe | Cu | Mn | Mg |
|---|---|---|---|---|---|
| +2" | .17 | .39 | .11 | .95 | .96 |
| −2" + 1" | .18 | .39 | .10 | .91 | 1.05 |
| −1" + ½ | .17 | .39 | .11 | .90 | 1.10 |
| −½" + 0.265" | .17 | .39 | .10 | .87 | 1.03 |
| −0.265" + 4 | .22 | .38 | .10 | .83 | 1.63 |
| −4 + 7 | .18 | .36 | .09 | .73 | 2.08 |
| −7 + 10 | .17 | .32 | .07 | .60 | 2.70 |
| −10 | .23 | .32 | .11 | .55 | 1.54 |

TABLE IV

Chemical Analyses of Size Fractions Exiting the Kiln at a Set Temperature: 1100° F.

| U.S. Screen | Si | Fe | Cu | Mn | Mg |
|---|---|---|---|---|---|
| +2" | .17 | .41 | .12 | .94 | .48 |
| −2" + 1" | .18 | .42 | .12 | .97 | .66 |
| −1" + ½ | .19 | .42 | .12 | .98 | .64 |
| −½" + 0.265" | .18 | .41 | .12 | .94 | .56 |
| −0.265" + 4 | .17 | .35 | .09 | .73 | 1.36 |
| −4 + 7 | .15 | .30 | .19 | .56 | 2.57 |
| −7 + 10 | .15 | .29 | .06 | .46 | 2.15 |
| −10* | — | — | — | — | — |

TABLE V

Chemical Analyses of Size Fractions Exiting the Kiln at a Set Temperature: 1120° F.

| U.S. Screen | Si | Fe | Cu | Mn | Mg |
|---|---|---|---|---|---|
| +2" | .19 | .44 | .13 | 1.05 | .58 |
| −2" + 1" | .18 | .43 | .12 | 1.02 | .66 |
| −1" + ½ | .18 | .44 | .12 | 1.03 | .67 |
| −½" + 0.265 | .18 | .43 | .12 | 1.02 | .57 |
| −0.265" + 4 | .21 | .37 | .10 | .82 | 1.61 |
| −4 + 7 | .17 | .30 | .07 | .52 | 2.97 |
| −7 + 10 | .18 | .25 | .05 | .36 | 3.43 |
| −10 | .50 | .29 | .07 | .36 | 3.35 |

TABLE VI

Chemical Analyses of Fractions Resulting From Further Fractionation of the Minus 10 Material Exiting the Kiln at Set Temperature 1120° F.

| U.S. Screen | wt. % | Si | Fe | Cu | Mn | Mg |
|---|---|---|---|---|---|---|
| −10 + 14 | 2.6 | .15 | .27 | .04 | .38 | 3.67 |
| −14 + 18 | 1.9 | .16 | .28 | .04 | .38 | 3.82 |
| −18 + 20 | 0.5 | .21 | .26 | .04 | .35 | 3.64 |
| −20 + 25 | 0.4 | .35 | .21 | .05 | .33 | 3.74 |
| −25* | 1.8 | — | — | — | — | — |

TABLE VII

Analysis of Minus 25 Material Exiting the Kiln at a Set Temperature: 1120° F.

| | | |
|---|---|---|
| % Aluminum by Hydrogen Evolution | | 56.2% |
| Chemical Analysis: | Al | 56.7% |
| | Fe | 1.74% |
| | Si | 10.8% |
| Calculated | $SiO_2$ | 23.1% |
| % Magnetic Material | | 1.87% |
| X-ray Diffraction: | Aluminum | >10% |
| | Quartz | >10% |
| | MgO | <10% |
| | Unidentified | <10% |

TABLE VIII

Chemical Analyses from Whole Can Experiment Having 3004 Bodies and 5182 Ends

| | End Fragments | Body Parts |
|---|---|---|
| Si | 0.10 | 0.19 |
| Fe | .25 | .40 |
| Cu | .03 | .14 |
| Mn | .36 | 1.09 |
| Mg | 3.69 | .7 |
| Cr | .02 | .01 |
| Ni | .00 | .00 |
| Zn | .02 | .04 |
| Ti | .01 | .02 |

TABLE IX

| Alloy | Silicon | Iron | Copper | Manganese | Magnesium | Chromium | Zinc | Titanium | Others Each | Total |
|---|---|---|---|---|---|---|---|---|---|---|
| AA3003 | 0.6 | 0.7 | 0.05–0.2 | 1.0–1.5 | — | — | 0.10 | — | 0.05 | 0.15 |
| AA3004 | 0.30 | 0.70 | 0.25 | 1.0–1.5 | 0.8–1.3 | — | 0.25 | — | 0.05 | 0.15 |
| AA3104 | 0.6 | 0.8 | 0.5–0.25 | 0.8–1.4 | 0.1–1.3 | — | 0.25 | 0.10 | 0.05 | 0.15 |

Note:
In Table IX, the balance is aluminum, and composition is in wt. % max. unless shown as a range.

TABLE X

| Alloy | Silicon | Iron | Copper | Manganese | Magnesium | Chromium | Zinc | Titanium | Others Each | Total |
|---|---|---|---|---|---|---|---|---|---|---|
| AA5182 | 0.20 | 0.35 | 0.15 | 0.20–0.50 | 4.0–5.0 | 0.10 | 0.25 | 0.10 | 0.05 | 0.15 |
| AA5082 | 0.02 | 0.35 | 0.15 | 0.15 | 4.0–5.0 | 0.15 | 0.25 | 0.10 | 0.05 | 0.15 |
| AA5052 | 0.45 | Si + Fe | 0.10 | 0.10 | 2.2–2.8 | 0.15–0.35 | 0.10 | — | 0.05 | 0.15 |
| AA5042 | 0.20 | 0.35 | 0.15 | 0.20–0.50 | 3.0–4.0 | 0.10 | 0.25 | 0.10 | 0.05 | 0.15 |

Note:
In Table X, the balance is aluminum, and composition is in wt. % max. unless shown as a range.

While the invention has been described in terms of preferred embodiments, the claims appended hereto are intended to encompass other embodiments which fall within the spirit of the invention.

What is claimed is:

1. A continuous process for the recovery of an aluminum alloy from aluminum scrap containing more than one alloy, the recovery made in a manner which will conserve energy, the process which comprises:

(a) providing a feedstock containing at least two components therein comprised of different aluminum alloys having different incipient melting temperatures, the components having at least parts thereof joined to each other;

(b) heating and agitating the feedstock sufficiently to cause said joined components to become detached from one another by fragmentation of the component having the lower incipient melting temperature;

(c) separating one of the detached components from the remainder of the feedstock;

(d) melting at least one of the separated components; and (e) thereafter continuously casting an aluminum alloy from said melted component without substantially upgrading the composition thereof to provide a cast alloy having a composition substantially the same as that from which said separated component was fabricated.

2. The process of claim 1 wherein said melted aluminum alloy is cast into a slab which is rolled to form a sheet product.

3. The process of claim 2 wherein said aluminum sheet is fabricated into a shaped article.

4. The process of claim 1 wherein said melted aluminum alloy article is cast into a strip having a thickness of not greater than 0.5 inch and wherein said strip has been worked to destroy the as-cast structure of the strip.

5. The process of claim 1 wherein said melted aluminum alloy is cast directly into a sheet of final guage.

6. The process of claim 5 wherein said sheet has a thickness in the range of 0.004 to 0.10 inch.

7. The process of claim 5 wherein said sheet has a thickness in the range of 0.03 to 0.10 inch.

8. A continuous process for the recovery of an aluminum alloy from aluminum scrap containing more than one alloy, the recovery made in a manner which will conserve energy, the process which comprises:

(a) providing a feedstock containing at least two components therein fabricated of different aluminum alloy products having different incipient melting temperatures;

(b) heating the feedstock to a temperature sufficiently high to render fracture sensitive the component having the lowest incipient melting temperature;

(c) subjecting said heated feedstock to agitation sufficient to cause said component having the lowest incipient melting temperature to fragment;

(d) segregating said components based on said fragmentation;

(e) melting on a continuing basis at least one of the components; and (f) thereafter continuously casting an aluminum alloy from said melted component without substantially upgrading the composition thereof, the cast alloy having a composition substantially the same as that from which said separated component was fabricated.

9. The process of claim 8 wherein the feedstock contains used containers comprised of aluminum alloys.

10. The process of claim 8 wherein the feedstock contains used beverage containers having a body portion fabricated from AA3004 and a lid portion fabricated from AA5182.

11. The process of claim 10 wherein the lids are separated from the bodies and the bodies are remelted in accordance with step (e).

12. The process in accordance with claim 8 wherein the feedstock contains containers having body portions fabricated from an aluminum alloy selected from the group consisting of AA 3003, AA 5042, AA 3004, AA 3104 and AA 5052 and have ends on said containers fabricated from an aluminum alloy selected from the group consisting of AA 5182, AA 5082, AA 5052 and AA 5042.

13. The process in accordance with claim 8 wherein the feedstock is heated to a temperature in the range of 900° to 1155° F.

14. A continuous process for the recovery of an aluminum alloy from aluminum scrap containing more than one alloy, the recovery made in a manner which will conserve energy, the process which comprises:

(a) providing a feedstock containing containers having body portions fabricated from AA 3004 and having ends thereon fabricated from AA 5182;

(b) heating the feedstock to a temperature in the range of 900° to 1155° F. to initiate incipient melting of said AA 5182 end;

(c) subjecting said feedstock to agitation sufficient to cause said ends to fragment and become detached from said bodies;

(d) while maintaining the bodies and ends in a heated condition to minimize heat input required for melting, segregating said bodies from said ends and melting on a continuous basis the bodies recovered from said ends; and (e) thereafter continuously casting AA 3004 alloy from said melted components without substantially upgrading the composition thereof.

15. The process in accordance with claim 11 wherein said cast product is rolled into a sheet product.

16. The process in accordance with claim 12 wherein said sheet product is fabricated into a shaped article.

17. The process in accordance with claim 15 wherein the melt is cast into a strip having a thickness of not greater than 0.5 inch and wherein said strip has been worked to destroy the as-cast structure of the strip.

18. The process in accordance with claim 14 wherein the melt from said segregated scrap can be cast without upgrading or diluting the melt to bring it within the composition of the alloy from which it was recovered.

19. The process in accordance with claim 14 wherein the 5182 segregated material is melted in a melt of like composition and not more than 1.0 wt.% magnesium is added thereto to bring the melt within the AA composition ranges for 5182 alloy.

20. A continuous process for the recovery of an aluminum alloy from aluminum scrap containing more than one alloy, the recovery made in a manner which will conserve energy, the process which comprises:

(a) providing a feedstock containing containers having body portions fabricated from AA 3004 and having ends thereon fabricated from AA 5182;

(b) heating the feedstock to a temperature in the range of 900° to 1155° F. to initiate incipient melting of said AA 5182 end;

(c) subjecting said feedstock to agitation sufficient to cause said ends to fragment and become detached from said bodies;

(d) while maintaining the bodies and ends in a heated condition to minimize heat input required for melting, segregating said bodies from said ends and then melting on a continuous basis the bodies recovered from said ends;

(e) thereafter continuously casting AA 3004 alloy from said melted components without substantially upgrading the composition thereof;

(f) rolling said cast product to provide AA 3004 sheet stock suitable for forming into containers;

(g) screening said fragmented ends to remove foreign materials therefrom;

(h) melting said ends and upgrading the resulting melt by adding not greater than 1.0 wt.% Mg thereto; and (i) thereafter casting the adjusted melt resulting from said ends and rolling to provide a sheet stock suitable for forming into lids for containers.

21. An aluminum alloy sheet product recovered from aluminum scrap containing more than one alloy component, the sheet characterized by having substantially the same composition as the component from which it is recovered without substantially upgrading the major alloying components of the composition, the sheet recovered from the scrap by (a) providing a feedstock containing at least two components therein fabricated of different aluminum alloy products having different incipient melting temperatures;

(b) heating the feedstock to a temperature sufficiently high to render fracture sensitive the component having the lowest incipient melting temperature;

(c) subjecting said heated feedstock to agitation sufficient to cause said component having the lowest incipient melting temperature to fragment;

(d) segregating said components based on said fragmentation;

(e) melting on a continuing basis at least one of the components;

(f) thereafter continuously casting an aluminum alloy from said melted component without substantially upgrading the composition thereof, the cast alloy having a composition substantially the same as that from which said separated component was fabricated; and (g) fabricating said cast alloy into sheet product.

22. The product in accordance with claim 21 wherein the feedstock contains containers having bodies fabricated from AA 3004.

23. The product in accordance with claim 21 wherein the feedstock contains containers having lids or lid portions attached to said containers being fabricated from AA 5182.

24. The product in accordance with claim 21 wherein the melted aluminum alloy is cast into a sheet product of final gauge.

* * * * *

UNITED STATES PATENT AND TRADEMARK OFFICE
CERTIFICATE OF CORRECTION

PATENT NO. : 4,498,523

DATED : February 12, 1985

INVENTOR(S) : K. A. Bowman and M. E. Gantz, Jr.

It is certified that error appears in the above-identified patent and that said Letters Patent is hereby corrected as shown below:

| | |
|---|---|
| Col. 3, line 51 | Change "there" to --these--. |
| Col. 4, line 40 | Change "AA55182" to --AA5182--. |
| Col. 5, line 9 | Change "for" to --of--. |
| Col. 14, Table IV | Under the heading "U.S. Screen", change "-1"+ ½ " to ---1"+1/2"--. |
| Col. 14, Table V | Under the heading "U.S. Screen", change "-1"+ ½ " to ---1"+1/2"--. |
| Col. 14, Table V | Under the heading "U.S. Screen", change ½ "+0.265" to ---1/2"+0.265"--. |
| Col. 14, line 40 Table VI | At the end of Table VI, insert --*Contained insufficient metal content for quantometer analysis.--. |
| Col. 15, Table IX | Under the heading "copper", change "0.5-0.25" to --0.05-0.25--. |

Signed and Sealed this

Thirtieth Day of July 1985

[SEAL]

Attest:

DONALD J. QUIGG

Attesting Officer     Acting Commissioner of Patents and Trademarks